Jan. 2, 1940. C. W. FRANK 2,185,942
TABLE SERVICE
Filed April 11, 1939
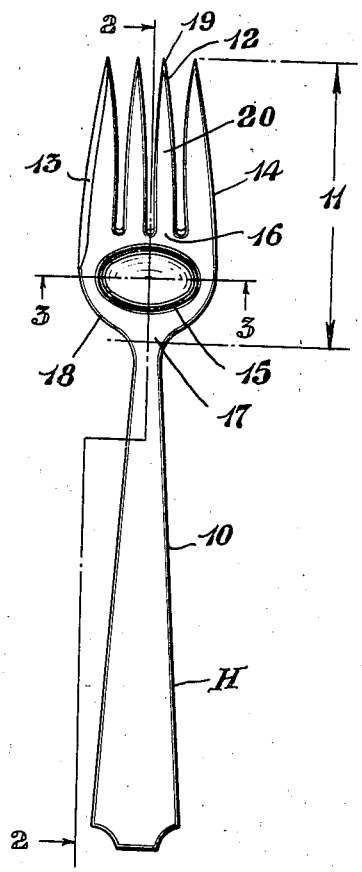
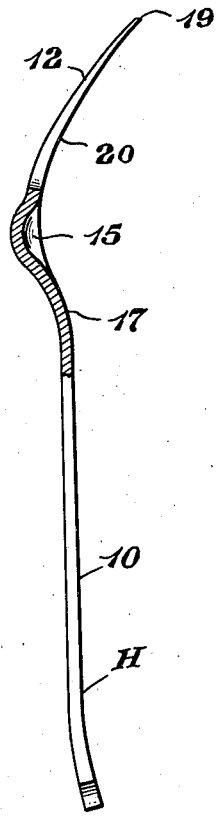
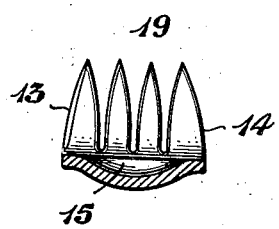
Inventor
C. W. Frank
By A. Yates Dowell
Attorney Patented Jan. 2, 1940

2,185,942

UNITED STATES PATENT OFFICE 2,185,942

TABLE SERVICE

Charles William Frank, Harrisonburg, Va.

Application April 11, 1939, Serial No. 267,267

2 Claims. (Cl. 30—147)

This invention relates to table service and more particularly to salad forks.

Prior to the instant invention, combination eating implements have been provided whereby a single instrument may be utilized for cutting meat and conveying it to the mouth. Such prior implements have been rather crude and unconventional in configuration so that their association with conventional table service might not be considered in good taste. Further, such prior implements have not been well arranged for the eating of salads which combine not only leafy vegetables such as lettuce and endives but pitted olives and other seeded edibles.

It is an object of the instant invention to provide an article of table service particularly adapted for use in connection with the eating of salads including leafy vegetables or seeded edibles or both.

It is a further object of the instant invention to provide an article of table service which may be associated with conventional table service in good taste and which includes a receptacle particularly adapted for conveying unedible portions which have been disassociated from edible portions in the mouth of the user back to the plate without embarrassment.

Other objects and the nature and advantages of the invention will be apparent from the following description taken in conjunction with the accompanying drawing, wherein:

Fig. 1 is a plan view of a salad fork in accordance with the invention;

Fig. 2 is a view taken along line 2—2 of Fig. 1 and looking in the direction of the arrows; and, Fig. 3 is a sectional view of the embodiment illustrated in Fig. 1 taken along line 3—3 and looking in the direction of the arrows.

Referring to the drawing, a salad fork 10 is provided with a relatively short shovel portion 11 and a handle portion H of such dimensions which correspond to those dimensions usually given to similar portions of salad forks considered to be in good taste. The shovel portion 11 is provided with the usual number of relatively wide flat prongs 12 curved in the conventional manner, see Fig. 2. One side 13 of the shovel portion 11 may be sharpened to facilitate the cutting of such salad foods as lettuce, endives and celery. It is to be understood that the side 14 as well as the side 13 may be sharpened but only the side 13 has been so illustrated.

In addition to the provision of a conventional shovel portion 14, the prongs 12, and the sharpened side 13, to further aid in the eating of such salad ingredients as pitted olives or other seeded edibles, the elliptical dished receptacle 15 is formed integral with the shovel portion 11 and located between the inner ends 16 of the prongs 12 and the inner end 17 of the handle H. This elliptical dish shaped receptacle 17 is formed in that part of the fork 10 which normally serves no useful purpose and is general inconspicuous. Further, the dish shaped receptacle is ideally shaped to convey unedible pits and seeds from the mouth of the user back to the plate without embarrassment, which shape follows the contours of the inner end 18 of the shovel portion 11 and thereby does not unfavorably detract from the conventional design of a salad fork considered to be in good taste. In fact the utilitarian dish shaped receptacle 15 is actually pleasing. Not only does the dish shaped receptacle 15 provide means for conveying without embarrassment unedible portions of food such as pits and seeds back to the plate but it does not interfere with the conventional use of the salad fork during the operation of conveying food from the plate to the user's mouth by enlisting the aid of the utilitarian prongs 12, the points 19 of which are designed to engage food particles when necessary and the flat upper portions 20 of which are utilized for shoveling food which is to be conveyed to the user's mouth as prescribed by the rules of etiquette.

In practice when table service is laid on the dining table, the eating element 10 takes the place of the conventional salad fork without interfering with the good taste of the entire table service. When the salad dish is served which generally comprises some leafy vegetable such as lettuce and some pitted or seeded vegetable such as an olive, the user of the salad fork will feel more inclined to completely appreciate the entire salad and not refrain from tasting those portions of the salad which might be embarrassing to eat because their characteristics are such that the successful conveyance of small portions thereof to the mouth, as is required by the rules of etiquette, is a difficult task, and the manner in which the seeds or pits of those edibles which contain same is not always contemplated by those who originate the salad dishes. Even though the dish may be particularly appetizing and desirable, the user may refrain from tasting same because of fear of embarrassment unless in place of the conventional salad fork, the salad eating implement 10 is provided which incorporates a novel combination of means for conveying unedibles from the mouth back to the plate which does not interfere with that portion of the implement which serves to convey food from the plate to the mouth and in fact may serve to aid same.

It will be obvious to those skilled in the art that various changes may be made in this device without departing from the spirit of the invention and therefore the invention is not limited to what is shown in the drawing and described in the specification but only as indicated in the appended claims.

What is claimed is:

1. A salad fork having a plurality of tines and a handle, a body portion joining the tines with the handle and formed with an elliptical depression for receiving pits and like unedible substances, with the major axis of the ellipse lying tranversely of the fork, said depression being relatively shallow and occupying a portion only of the body so as to leave a substantial part of the body on all sides of the depression following the normal curvature of the fork, the fork tines being of greater overall length than the body portion and functioning to convey food to the mouth of the user and the depression facilitating return of unedible substances from the mouth back to the plate.

2. A salad fork comprising a fork proper and a handle, the fork proper comprising a plurality of tines and a body portion joining the tines with the handle and formed with an elliptical depression for receiving pits and like unedible substances, the major axis of the ellipse lying transversely of the fork, said depression occupying a portion only of the body leaving a substantial part of the body on all sides of the depression following the normal curvature of the fork, the fork tines being of greater overall length than the body portion and functioning to convey food to the mouth of the user and the depression facilitating the return of unedible substances from the mouth back to the plate, the outwardly facing edge of one of the outer tines of the fork being sharpened to facilitate cutting foods, said sharpened edge terminating adjacent the base of the tine.

CHARLES WILLIAM FRANK.